(12) United States Patent
Dinov et al.

(10) Patent No.: US 10,915,729 B2
(45) Date of Patent: Feb. 9, 2021

(54) THREE-DIMENSIONAL CELL AND TISSUE IMAGE ANALYSIS FOR CELLULAR AND SUB-CELLULAR MORPHOLOGICAL MODELING AND CLASSIFICATION

(71) Applicant: The Regents of The University of Michigan, Ann Arbor, MI (US)

(72) Inventors: Ivaylo Dinov, Ann Arbor, MI (US); Brian D. Athey, Ypsilanti, MI (US); David S. Dilworth, Ann Arbor, MI (US); Ari Allyn-Feuer, Ypsilanti, MI (US); Alexandr Kalinin, Ann Arbor, MI (US); Alex S. Ade, Ann Arbor, MI (US)

(73) Assignee: THE REGENTS OF THE UNIVERSITY OF MICHIGAN, Ann Arbor, MI (US)

(*) Notice: Subject to any disclaimer, the term of this patent is extended or adjusted under 35 U.S.C. 154(b) by 131 days.

(21) Appl. No.: 16/277,128

(22) Filed: Feb. 15, 2019

(65) Prior Publication Data
US 2019/0258846 A1     Aug. 22, 2019

Related U.S. Application Data

(60) Provisional application No. 62/632,663, filed on Feb. 20, 2018.

(51) Int. Cl.
*G06K 9/00*     (2006.01)
*G06K 9/46*     (2006.01)
(Continued)

(52) U.S. Cl.
CPC ........... *G06K 9/00147* (2013.01); *G01N 1/30* (2013.01); *G06K 9/0014* (2013.01);
(Continued)

(58) Field of Classification Search
CPC ............ G06K 9/00147; G06K 9/0014; G06K 9/00201; G06K 9/46; G06K 9/626;
(Continued)

(56) References Cited

U.S. PATENT DOCUMENTS

2016/0012583 A1   1/2016   Cales et al.
2016/0116384 A1   4/2016   Chen et al.
(Continued)

FOREIGN PATENT DOCUMENTS

JP     2014134517 A     7/2014

OTHER PUBLICATIONS

Y. Shi, et al "Robust Surface Reconstruction Via Laplace-Beltrami Eigen-Projection and Boundary Deformation", IEEE Transactions on Medical Imaging, vol. 29, No. 12 (Dec. 2010).
(Continued)

*Primary Examiner* — Michael R Neff
(74) *Attorney, Agent, or Firm* — Harness, Dickey & Pierce, P.L.C.

(57) ABSTRACT

The ability to automate the processes of specimen collection, image acquisition, data pre-processing, computation of derived biomarkers, modeling, classification and analysis can significantly impact clinical decision-making and fundamental investigation of cell deformation. This disclosure combine 3D cell nuclear shape modeling by robust smooth surface reconstruction and extraction of shape morphometry measure into a highly parallel pipeline workflow protocol for end-to-end morphological analysis of thousands of nuclei and nucleoli in 3D. This approach allows efficient and informative evaluation of cell shapes in the imaging data and represents a reproducible technique that can be validated, modified, and repurposed by the biomedical community. This facilitates result reproducibility, collaborative method validation, and broad knowledge dissemination.

21 Claims, 9 Drawing Sheets

(51) Int. Cl.
*G06K 9/62* (2006.01)
*G01N 1/30* (2006.01)
*G06T 7/62* (2017.01)
*G06T 7/50* (2017.01)

(52) U.S. Cl.
CPC .......... *G06K 9/00201* (2013.01); *G06K 9/46* (2013.01); *G06K 9/626* (2013.01); *G06K 9/6269* (2013.01); *G06K 9/6276* (2013.01); *G06K 9/6277* (2013.01); *G06K 9/6286* (2013.01); *G06T 7/50* (2017.01); *G06T 7/62* (2017.01); *G06T 2207/10056* (2013.01); *G06T 2207/30024* (2013.01); *G06T 2207/30242* (2013.01)

(58) Field of Classification Search
CPC .. G06K 9/6269; G06K 9/6276; G06K 9/6277; G06K 9/6286; G01N 1/30; G06T 7/62; G06T 7/50; G06T 2207/10056; G06T 2207/30024; G06T 2207/30242
USPC ......................................................... 382/133
See application file for complete search history.

(56) References Cited

U.S. PATENT DOCUMENTS

| | | |
|---|---|---|
| 2016/0304952 A1 | 10/2016 | Boyden et al. |
| 2016/0305856 A1 | 10/2016 | Boyden et al. |
| 2016/0305939 A1 | 10/2016 | Shemesh et al. |
| 2017/0011511 A1 | 1/2017 | Goodman et al. |
| 2017/0081489 A1 | 3/2017 | Rodrigues et al. |
| 2017/0089811 A1 | 3/2017 | Tillberg et al. |
| 2017/0362553 A1 | 12/2017 | Masumoto et al. |
| 2018/0025490 A1 | 1/2018 | Lu et al. |

OTHER PUBLICATIONS

A. Kalinin Poster—2014, The Second Annual Gilbert S. Omenn Lectureship, University of Michigan, Ann Arbor, Michigan (Sep. 29, 2014).
A. Kalinin, "Design and Implementation of Machine Learning Based Tools and Workflows for Biomedical Data Analysis", 2016 MLDAS Annual Symposium Post Session, Ann Arbor, Michigan (Nov. 15, 2016).
A. Kalinin MLDAS-2015-Poster; Machine Learning and Data Analytics Symposium, MLDAS 2015 (Mar. 2015).
A. Kalinin ICML 2017 Poster; 2016 Workshop on Computational Biology at the 33rd International Conference on Machine Learning (ICML 2017) (Jun. 2016).
AA 4D Nuclear and Chromosome-Territory Shape Morphometry Protocol, The Second Annual Ann Arbor 4D Nuclear Imaging and Integrative Informatics Workshop, Ann Arbor, Michigan (Jul. 2014).
A. Kalinin et al "3D Cell Nuclear Morphology: Microscopy Imaging Dataset and Voxel-Based Morphometry Classification Results", bioRxv 168:84-88 (2017).
A. Kalinin et al "3D Shape Modeling for Cell Nuclear Morphological Analysis and Classification", Scientific Reports, 8(1): 13658 (2018).

THREE-DIMENSIONAL CELL AND TISSUE IMAGE ANALYSIS FOR CELLULAR AND SUB-CELLULAR MORPHOLOGICAL MODELING AND CLASSIFICATION

CROSS-REFERENCE TO RELATED APPLICATIONS

This application claims the benefit of U.S. Provisional Application No. 62/632,663, filed on Feb. 20, 2018. The entire disclosure of the above application is incorporated herein by reference.

GOVERNMENT CLAUSE

This invention was made with government support under NR015331, NS091856; DK089503 and EB020406 awarded by the National Institute of Health and IIS-636840 awarded by the National Science Foundation. The government has certain rights in the invention.

FIELD

The present disclosure relates to three-dimensional cell and tissue image analysis for cellular and sub-cellular morphological modeling and classification.

BACKGROUND

Tissue and cellular deformation is regulated by complex underlying biological mechanisms that affect spatial and temporal morphological changes. Understanding of these processes through quantitative analysis in three dimensional changes in size and shape of cellular and subcellular structures is important not only for investigating the cell organization, but also for detection and treatment of pathological conditions, such as cancer. However, dimensionality and quality of imaging data, together with a great variability of cellular and subcellular shapes in a population present challenges for three-dimensional shape methods that should permit accurate morphological analysis, be scalable, robust to noise, and specific enough across populations at the same time. Thus, there is a compelling need for robust three-dimensional cellular and subcellular morphometric techniques with high-throughput capabilities to carry out population-wise analysis.

This section provides background information related to the present disclosure which is not necessarily prior art.

SUMMARY

This section provides a general summary of the disclosure, and is not a comprehensive disclosure of its full scope or all of its features.

An automated method is presented for analyzing biological cells. The method includes: staining constituents of a biological sample, where the biological sample includes at least one cell; receiving image data of the biological sample, where the image data provides a three-dimensional representation of the biological sample; labeling constituents of the at least one cell in the image data; for each labeled cell nuclei in the image data, constructing a mathematical representation of boundaries defining a given cell nuclei; extracting features for each of the labeled cell nuclei using the mathematical representation of the cell nuclei, where the features are measures of shape and size of the labeled cell nuclei; for each labeled cell nucleoli, constructing a mathematical representation of boundaries defining a given cell nucleoli; extracting features from each of the labeled cell nucleoli using the mathematical representation of the cell nucleoli, where the features are measures of shape and size of the labeled cell nucleoli; storing two or more models for cell classification; and classifying the biological sample by comparing the extracted features of the labeled cell nucleus and the labeled cell nucleolus to the stored models.

The image data may be generated by a confocal microscope or another type of imaging device.

In one embodiment, the a mathematical representation is constructed using an iterative Laplace-Beltrami eigen-projection and boundary deformation.

In some embodiments, labeling constituents includes segmenting the image data into volumes which represent the constituents.

The features extracted from the labeled cell nucleus may include but are not limited to determining one or more of a volume of a labeled cell nuclei, a surface area of a labeled cell nuclei, mean curvature of a labeled cell nuclei, shape index of a labeled cell nuclei, curvedness index of a labeled cell nuclei, and fractal dimension of a labeled cell nuclei.

The features extracted from the labeled cell nucleolus may include but are not limited to determining one or more of a count of nucleoli in corresponding cell nuclei, a volume of a labeled cell nucleoli, surface area of a labeled cell nucleoli, mean curvature of a labeled cell nucleoli, shape index of a labeled cell nucleoli, curvedness index of a labeled cell nucleoli, and fractal dimension of a labeled cell nucleoli.

In one embodiment, the biological sample is classified using a random forest classification method.

In other embodiments, the biological sample is classified using a classification method selected from a group consisting of linear classifiers, k nearest neighbor method, decision tree methods, neural networks and support vector machines.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 provides an overview of an automated method for morphological modeling and classification.

Figure 6A:
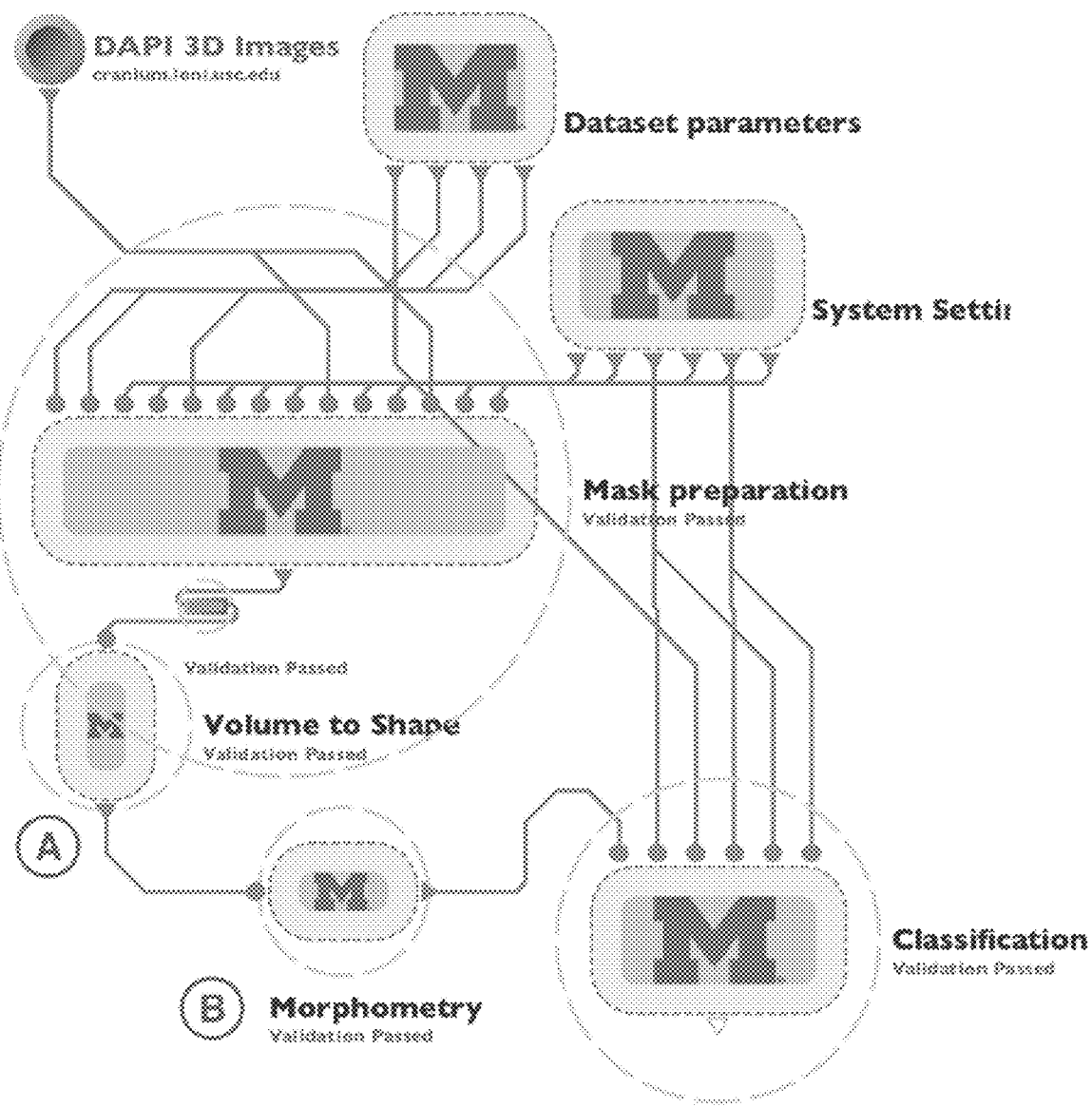
Figure 6B:
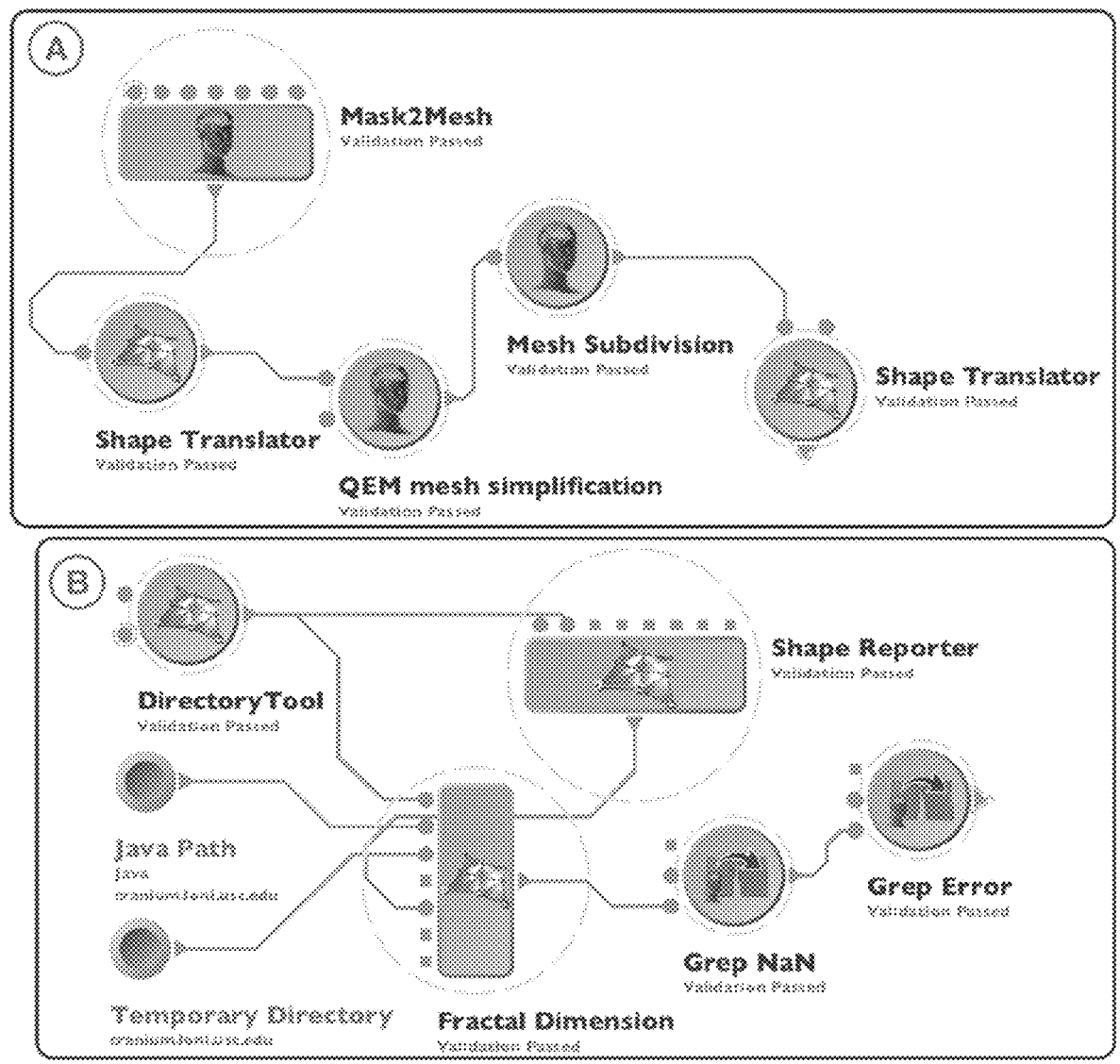

FIGS. 6A and 6B illustrate an exemplar graphical end-to-end workflow in the LONI Pipeline client interface which includes overview of the validated end-to-end workflow protocol showing nested groups of modules; expanded Volume to Shape group that includes modules that perform 3D shape modeling refinement; and the expanded Morphometry group that includes module that perform morphological measure extraction.

Figure 7B:
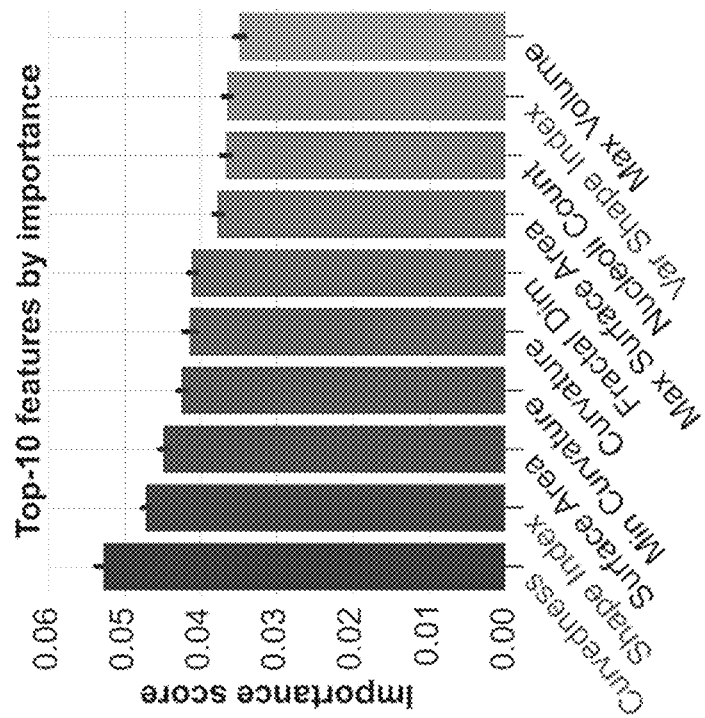
Figure 7A:
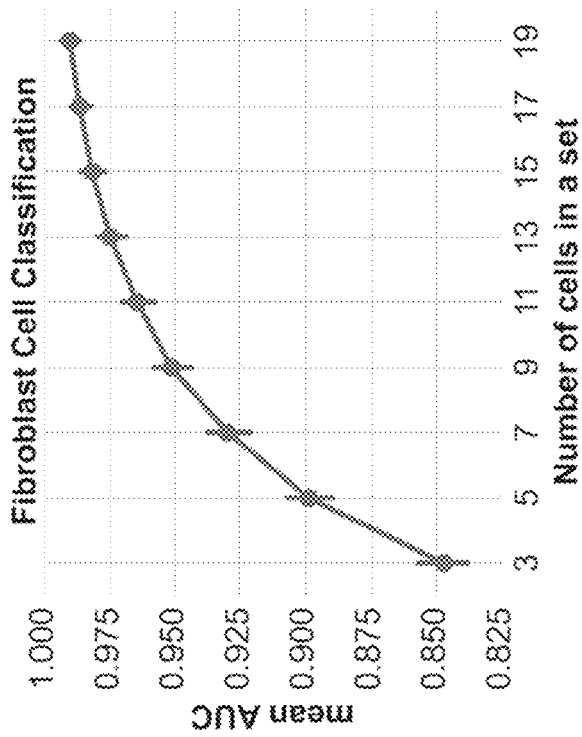

FIGS. 7A and 7B are graphs depicting showing fibroblast classification results. In FIG. 7A, mean AUC is shown for various cell set sizes; whereas, in FIG. 7B, top-10 features for classification are shown by importance score (right, nucleolar feature names start with Avg, Min, Max or Var, feature names that were also reported in top-10 for PC3 cells are shown in blue font.

Figure 8A:
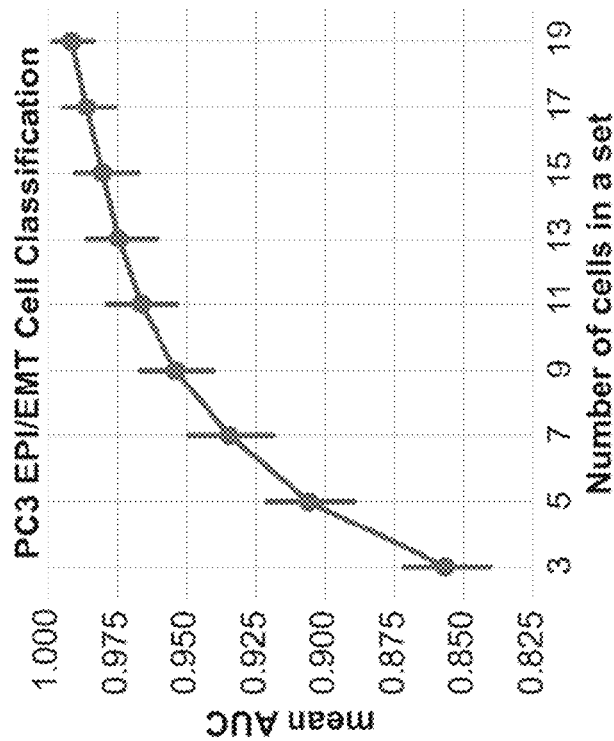
Figure 8B:
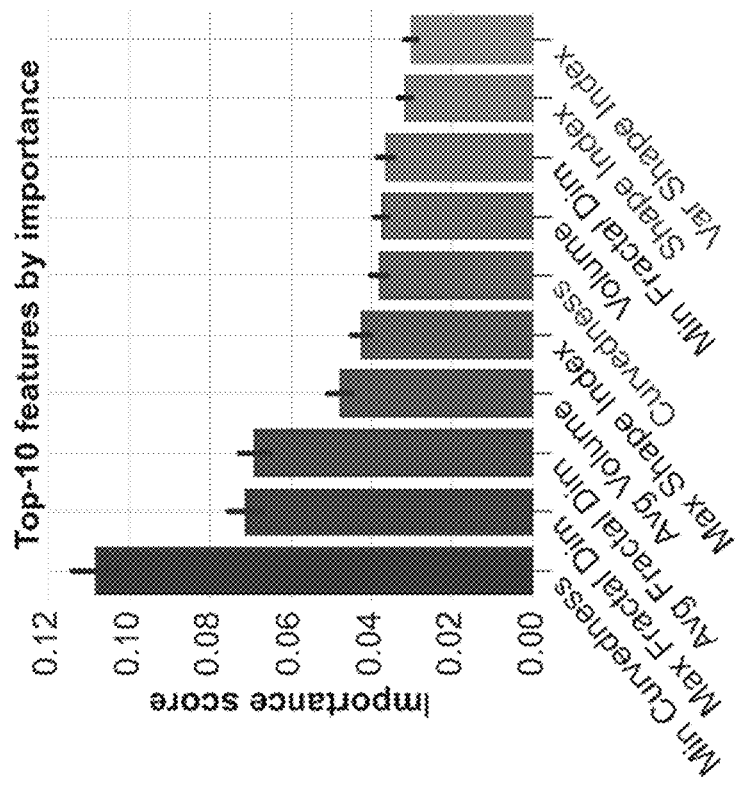

FIGS. 8A and 8B are graphs depicting PC3 classification results. In FIG. 8A, mean AUC is shown for various cell set sizes; whereas, in FIG. 8B, top-10 features for classification by importance score (right, nucleolar feature names start with Avg. Min, Max or Var, feature names that were also reported in top-10 for Fibroblast cells are shown in blue font).

Corresponding reference numerals indicate corresponding parts throughout the several views of the drawings.

DETAILED DESCRIPTION

Example embodiments will now be described more fully with reference to the accompanying drawings.

Tissue and cell morphology is regulated by complex underlying biological mechanisms related to cell differentiation, development, proliferation and disease. Changes in the nuclear form are reflective of reorganization of chromatin architecture related to the altered functional properties such as gene regulation and expression. At the same time, many studies in mechanobiology show that geometric constraints and mechanical forces applied to a cell deformity and conversely, affect nuclear and chromatin dynamics, gene and pathway activation. Thus, cell or cell organelle and component morphological quantification becomes of major relevance as the studies of the reorganization of the chromatin and DNA architecture in the spatial and temporal framework, known as the 4D nucleome, emerge. Cellular structures of interest in the context of the 4D nucleome include not only the nucleus itself, but also the nucleolus and nucleolar-associating domains, chromosome territories, topologically associating domains, lamina-associating domains, and loop domains in transcription factories. Moreover, understanding of these processes through quantitative analysis of morphological changes also has many medical implications, for example, detection, understanding, and treatment of pathological conditions such as cancer. In the literature, cellular morphometry is often used for the analysis of form that encompasses quantitative measures of size and shape of cells, cellular organelles, components, and other cellular structures.

While much effort has been conducted to develop cell shape characteristics in 2D or pseudo-3D, several studies have demonstrated that 3D morphometric measures provide better results for nuclear shape description and discrimination than 2D features. However, 3D shape descriptors that permit robust morphological analysis and facilitate human interpretation are still under active investigation. Additionally, dimensionality and volume of acquired data, various image acquisition conditions, and great variability of cell shapes in a population present challenges for 3D shape analysis methods that should be scalable, robust to noise, and specific enough across cell populations at the same time. Thus, there is a compelling need for robust 3D cell morphometric techniques with high-throughput capabilities to carry out population-wise analysis.

This disclosure has two complementary aims. The first aim is to assess and validate 3D morphometry metrics for cell or sub-cellular organelle and component shape description. First, surfaces of 3D masks extracted from the microscopy data are reconstructed using Laplace-Beltrami eigen-projection and topology-preserving boundary deformation. Then we compute intrinsic and extrinsic geometric metrics, that are used as derived signature vectors (shape biomarkers) to characterize the complexity of the 3D shapes and discriminate between observed clinical and phenotypic traits. These metrics include volume, surface area, mean curvature, curvedness, shape index, and fractal dimension. Suggested modeling and analysis methods can be used for the shape quantification of cells, cell nuclei, and other sub-cellular organelles and components.

The second aim is to develop a reproducible pipeline workflow implementing the entire process that can be customized and expanded for deep exploration of associations between 3D cellular and sub-cellular shape phenotypes in health and disease. High-throughput imaging (HTI) can include automatization of liquid handling, microscopy-based image acquisition, image processing, and statistical data analysis. This work focuses on the last two aspects of this definition. A streamlined multi-step protocol is implemented that relies on a diverse set of tools and seamlessly connects in the LONI Pipeline workflow. This workflow meets modern standards for high-throughput imaging processing and analysis and is mostly automated with a focus on validity and reproducibility.

Figure 1:
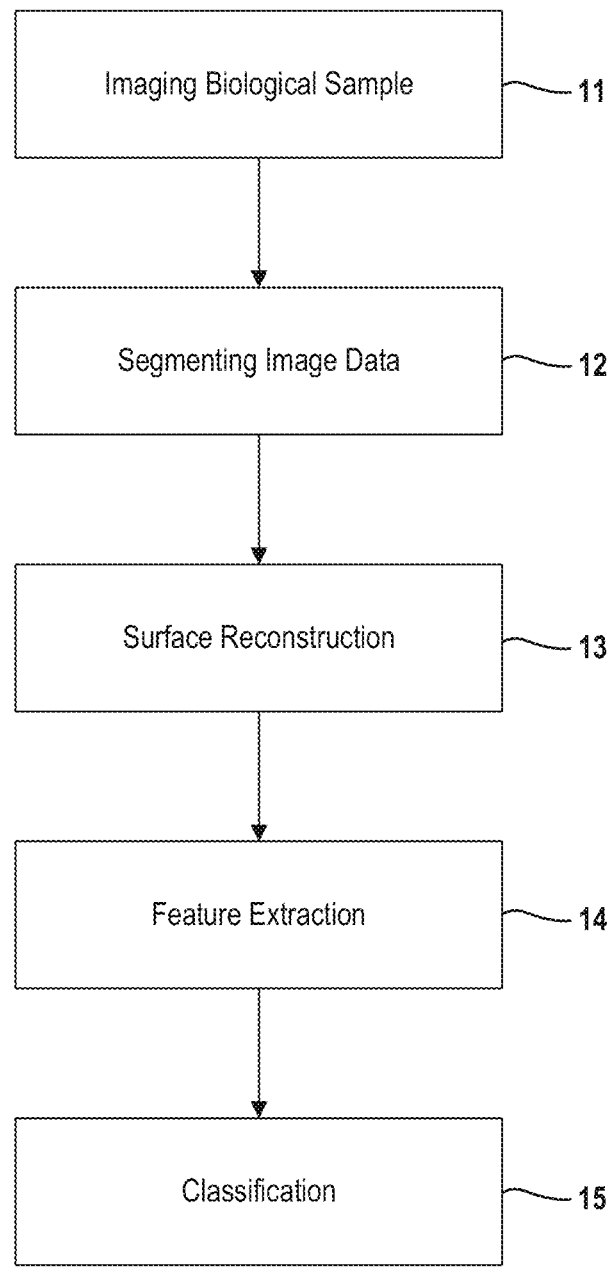

FIG. 1 show a high-level view of the end-to-end protocol. As a starting point, a biological sample including at least one cell is imaged at 11, using a three-dimensional image acquisition technique, including but not limited by microscopy, for example, confocal microscopy, multi-photon microscopy, light-sheet microscopy, and super-resolution microscopy; tomography, for example, fluorescence activated cell sorting (FACS) tomographic imaging, holographic tomography, and optical coherence tomography; or photoacoustic imaging. In one embodiment, 3D confocal imaging is performed using a Zeiss LSM 710 laser scanning confocal microscope with a 63× PLAN/Apochromate 1.4na DIC objective lens. The microscope imaging generates image data for the biological sample, where the image data provides a three-dimensional representation of the biological sample. The biological sample preferable includes three to twenty cells for improved classification as will be described in more detail below. It is understood that the biological sample may be taken from tissues or a cell culture.

Image data is segmented at 12 into individual volumes representing different constituents (i.e. organelle) which comprise the cells in the biological sample. For example, boundaries of nucleus in the cells are labeled in the image data. Likewise, nucleoli in each nucleus are labeled in the image data. Separate masks (i.e., binary images) may be generated for each constituent element in the cells. In the example embodiment, the masks are converted to a standardized file format, such as Neuroimaging Informatics Technology Initiative (NIFTI). Segmentation may also include other filtering or signal processing as will be further described below.

For each labeled cell or sub-cellular organelles and components in the image data, surface reconstruction is performed at 13. That is, a mathematical representation of boundaries which define a given cell nuclei are constructed. As a result, the boundary surface for each labeled object is represented by a polygon mesh. In an example embodiment, the mathematical representation for the surface of a given nuclei is constructed using an iterative Laplace-Beltrami eigen-projection and boundary deformation method. Further information regarding this example surface reconstruction method is described by Yonggang Shi et. al. in "Robust Surface Reconstruction via Laplace-Beltrami Eigen-Projection and Boundary Deformation" IEEE Transactions on Medical Imaging, Vol. 29, No. 12, December 2010 which is incorporated in its entirety herein. Other methods for constructing a mathematical representation of a boundary surface are also contemplated by this disclosure.

Next, features for each of the labeled cells or sub-cellular organelle or components are extracted at 14 from the mathematical representation of the surface boundaries for the cell or sub-cellular organelle or components. The features are measures of shape and size of the labeled cell or sub-cellular organelle or component. For example, features extracted from the labeled cell or sub-cellular organelle or component may include but are not limited to volume of a cell or sub-cellular organelle or component, surface area of a cell or sub-cellular organelle or component, mean curvature of a cell or sub-cellular organelle or component, shape index of a cell or sub-cellular organelle or component, curvedness index of a cell or sub-cellular organelle or component, and fractal dimension of a cell or sub-cellular organelle or component.

In the example embodiment, the features are measures of shape and size of the labeled cell nuclei. For example, features extracted from the labeled cell nuclei may include but are not limited to volume of a cell nuclei, surface area of a cell nuclei, mean curvature of a cell nuclei, shape index of a cell nuclei, curvedness index of a cell nuclei, and fractal dimension of a cell nuclei. Features may also be extracted for each of the labeled cell nucleolus. Again, the features are measures of shape and size of the labeled cell nucleolus. Example features include but are not limited to a count of nucleoli in the labeled cell, volume of a cell nucleoli, surface area of a cell nucleoli, mean curvature of a cell nucleoli, shape index of a cell nucleoli, curvedness index of a cell nucleoli, and fractal dimension of a cell nucleoli. It is readily understood that other types of features may be extracted and used for classification.

Lastly, the cells in the biological sample are classified at step 15. In one embodiment, the geometric morphological features extracted from the cells can be used to distinguish between healthy cells and cancerous cells. Prior to imaging, two or more models for classification are determined. By comparing the extracted features (i.e., in feature vector form) to the stored models, the cells in the biological can be classified. In one embodiment, the cells are classified using a random forest classification method as will be further described below. While reference is made to a particular classification method, other classification methods fall within the scope of this disclosure, including linear classifiers, k nearest neighbor methods, decision tree methods, neural networks and support vector machines, among others.

An example embodiment is set forth in more detail below. Prior to imaging, constituents of a biological sample may be labeled (e.g., stained). In the example embodiment, cells were labeled with three different fluorophores: DAPI (4',6-diamidino-2-phenylindole) that is a common staining for the nuclei, while fibrillarin antibody (fibrillarin) and ethidium bromide (EtBr) were both used for nucleoli staining. Although fibrillarin is commonly used nucleolar label, it was found to be too specific for the shape modeling purposes due to great local intensity variation within the detected nucleolus, which made extraction of a mask shape problematic. It has been shown that ethidium bromide can be used for staining dense chromatin, nucleoli, and ribosomes. It was found that it provides better overall representation of nucleolar shape. Specific fibrillarin was combined via co-localization with ethidium bromide to confirm correct detection of nucleoli locations as described below.

Figure 2:
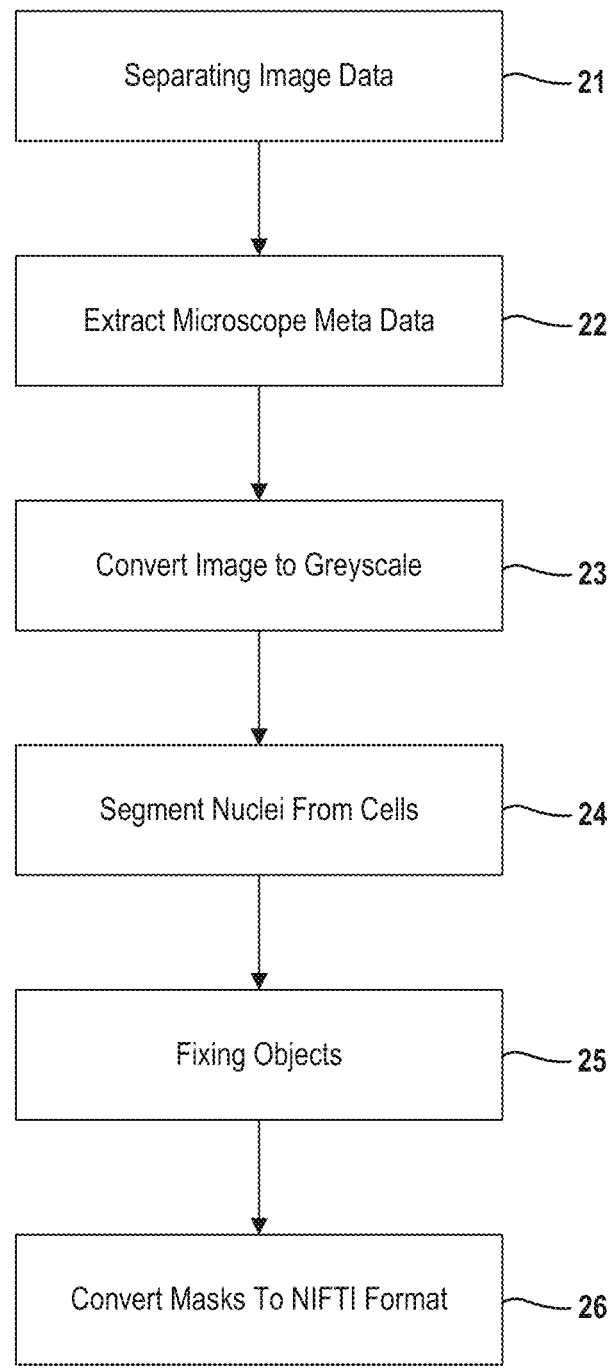
FIG. 2 is a flowchart depicting an example method for segmenting image data containing one or more cells.

Segmentation is further described in relation to FIG. 2. Based on labeling, the image data can be separated into two or more channels as indicated at 21. In the example embodiment, the channels were separated and saved as individual volumes labeled as $c0$, $c1$, $c2$, representing the DAPI, fibrillarin, EtBr channels, respectively. Each channel-specific volume was then resliced into a $1024 \times 1024 \times Z$ lattice ($Z=[10,50]$), where regional sub-volumes facilitating the alignment with the native tile size of the microscope. All subvolumes were then converted (losslessly) and saved as multi-image 3D TIFF volumes.

For every subvolume, accompanying microscope metadata was extracted at 22 from original data, including scaling in all three dimensions and resolution, and further passed to downstream modules to account for image anisotropy. Each subvolume was also converted to greyscale (e.g., 8 bit resolution) at 23. Despeckling or other noise reduction methods may be applied to the subvolumes.

Nuclei and nucleoli are segmented at 24 from the volumes. For example, automatic 3D segmentation of nuclei in the DAPI channel was performed by applying a nuclear segmentation algorithm, such as the one found in Farsight toolkit, to the DAPI channel sub-volumes. The Farsight toolkit was chosen for several reasons: it is a CLI tool that was created specifically to segment DAPI-stained nuclei in 2D/3D and is very easy to use. The Farsight toolkit also does not require labeled training set and demonstrated stable results on the data. The nuclear segmentation algorithm implements multiple steps which include a graph-cut algorithm to binarize the sub-volumes, a multi-scale Laplacian of Gaussian filter to convert the nuclei to blob masks, fast clustering to delineate the nuclei, and nuclear contour refinement using graph-cuts with alpha-expansions. After segmentation, data is converted to 16-bit 3D TIFF files. Each segmented nucleus was represented as a mask and given a unique index value. It is readily understood that other nuclear segmentation methods fall within the scope of this disclosure.

Automatic 3D segmentation of nucleoli in the fibrillarin and ethidium bromide channels was also performed, for example using the Weka Data Mining software package. In the example embodiment, the Trainable Weka Segmentation plugin was bundled with Fiji, an image processing and visualization software package based on ImageJ. Intra-nuclear segmentation was independently performed on ethidium bromide (EtBr) and fibrillarin stained nucleoli. The Trainable Weka Segmentation plugin is the most popular segmentation tool in ImageJ ecosystem and is relatively easy to use for labeling biological structures in 3D images. The DAPI nuclei masks were used to define segmentation spaces in the EtBr and fibrillarin channels with the goal of isolating sub-nuclear segmentations to objects within a nucleus. A classifier model was created for each channel by using a random selection of 10% of the sub-volumes within that channel for training. The models were then applied to all sub-volumes within a channel using a Random Forest algorithm. Nucleoli masks were created from the resulting probability maps. Connected component labeling was then performed using the "Find Connected Regions" ImageJ/Fiji plugin to uniquely index each nucleolus. Segmentation artifacts were filtered using a quality control protocol described below for nuclear masks. Finally, both EtBr and fibrillarin segmented volumes were used as input to a co-localization algorithm to validate the segmented EtBr-stained nucleoli based on the presence of fibrillarin. It is readily understood that other nucleoli segmentation methods fall within the scope of this disclosure.

Uneven staining often causes occasional segmentation artifacts, e.g., the resulting masks are complex, include "handles", "holes", or irregular boundary shapes with singularity points. This issue is typically addressed by applying various topology fixing techniques as indicated at step 25. Exemplary post-processing steps for the nuclear masks include hole-filling using a set of MATLAB functions. Filtering of artifacts can also be performed using other strategies, for instance, Java applications that measure spherical compactness of identified objects, estimate their volume by voxel count, and detect objects that either span the edge of a tile or are connected to other objects. Cutoff values for compactness and voxel counts were chosen empirically to remove most the artifacts. This filter, together with the hole-filling correction, helped generate masks that were more suitable for morphometric analysis. This quality control protocol corrected, or sifted out, masks that were potentially not genus zero and flagged them for further refinement. Finally, masks that passed quality control were converted at 26 to a neuroimaging format, such as the NIFTI format. These masks were used in the subsequent shape morphometry analysis in the pipeline workflow.

The dataset that served as the input to the morphometric feature extraction part of our workflow consisted of sets of 3D segmented and uniquely labeled volumes from channel c0, representing binary nuclear masks, accompanied by a set of 3D binary masks of nucleoli from channel c2 per nucleus, filtered by the co-localization procedure with c1, as described above. The segmented, quality-controlled nuclear and nucleolar volumes in compressed NIFTI format (.nii.gz), were converted from voxel masks into triangulated shape manifolds, and automatically processed using the developed workflow.

Figure 3:
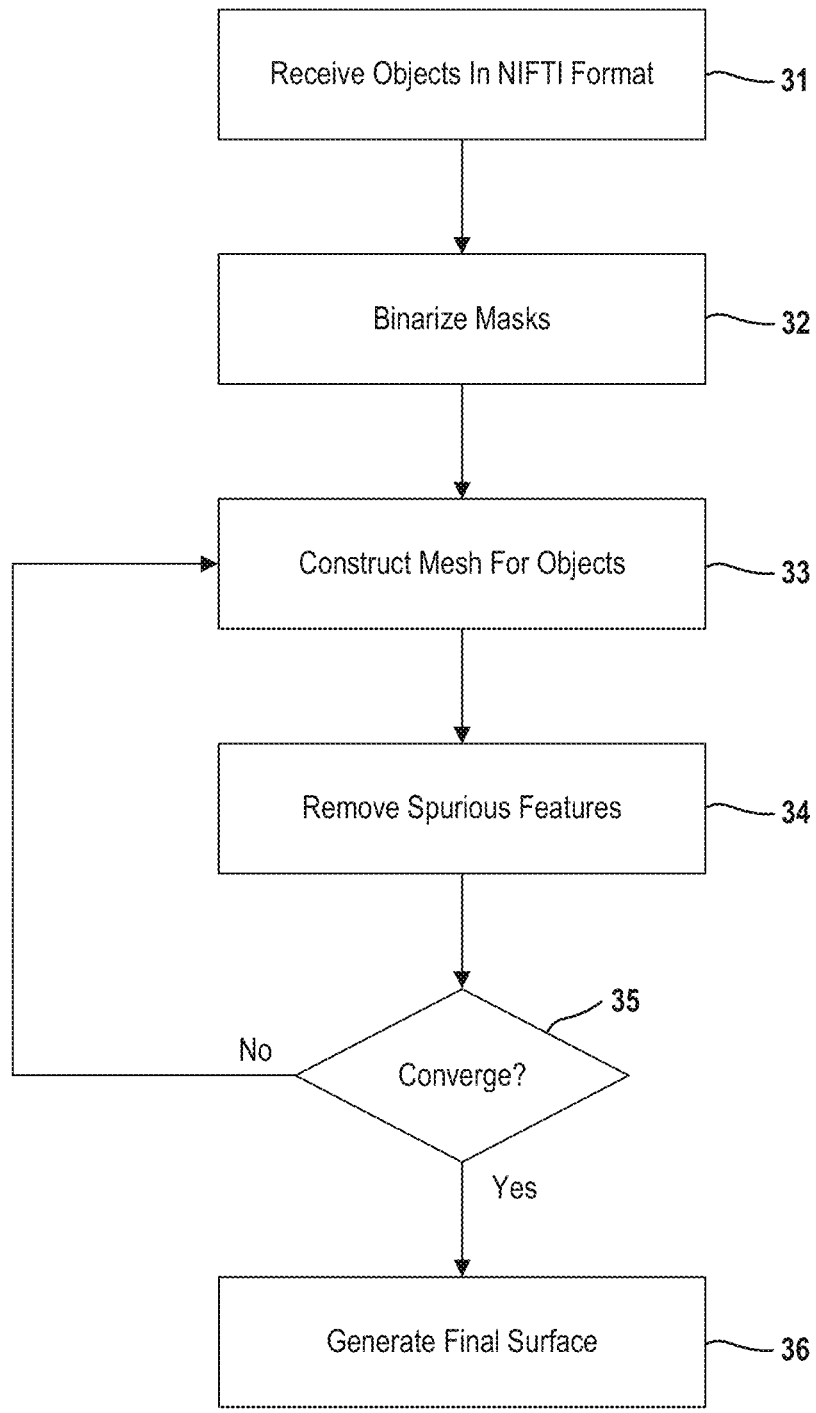
FIG. 3 is a flowchart depicting an example method for performing surface reconstruction of a cell or a sub-cellular organelle or component (e.g., nucleus, nucleolus).
Figure 4B:
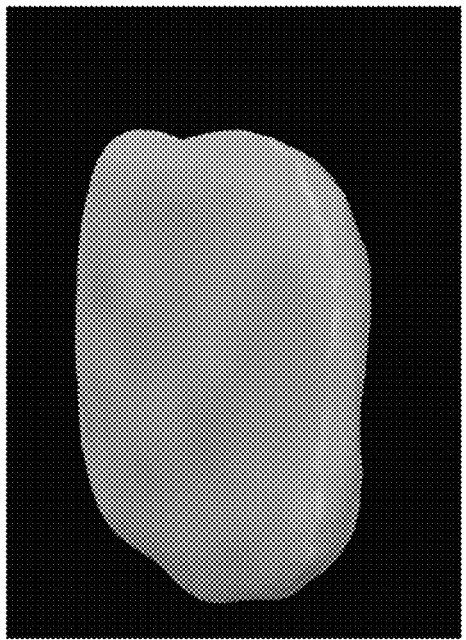
FIGS. 4A-4D are images of a robust smooth surface reconstruction, 3D visualization of: a binary mask representation of a nucleus segmented from a Fibroblast cell image; three binary mask for nucleoli segmented within this nucleus; a mesh representation of a reconstructed smooth surface of a nucleus; and three mesh representations of nucleolar surfaces, color-coded along the Z axis, respectively.
Figure 4D:
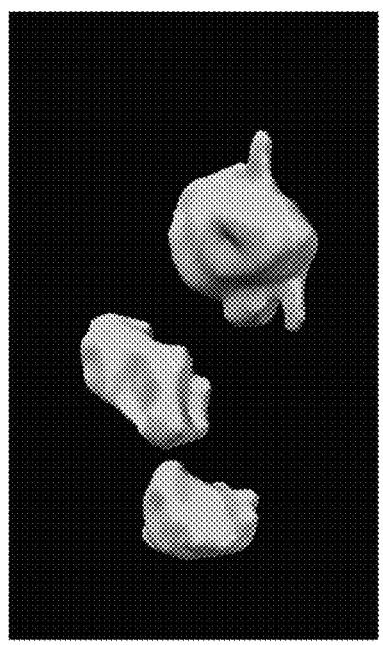
Figure 4A:
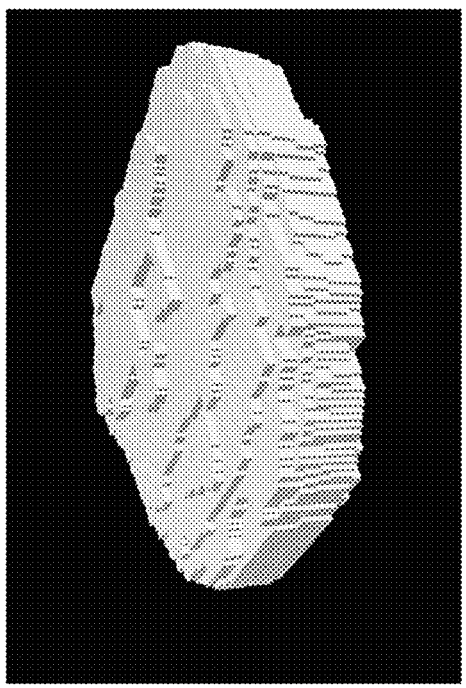
Figure 4C:
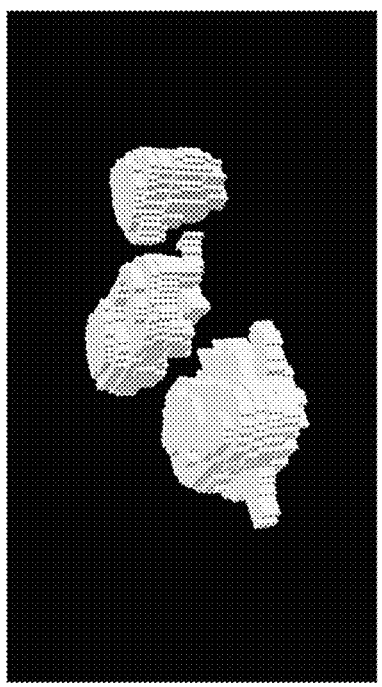

To model 3D shape of cell nuclei and nucleoli, boundaries of their 3D masks extracted from the microscopy data are modeled as 2-dimensional manifolds (homeomorphic to a 2-sphere $S^2$), that are embedded as triangulated surfaces in using iterative Laplace-Beltrami eigen-projection and topology-preserving boundary deformation algorithm. This approach is further described in relation to FIG. 3.

Objects are defined in the output received from the segmentation process. For each object, a mesh representation is constructed at 33 from the boundary of a binary mask of an object. Masks are made binary as indicated at 32 before the mesh representations are constructed. The boundary is projected onto the subspace of its Laplace-Beltrami eigen-functions, which allows automatically locate the position of spurious features by computing the metric distortion in eigen-projection. Laplace-Beltrami eigen-functions are intrinsically defined and can be easily computed from the boundary surface with no need of any parameterizations. They are also isometry invariant and thus are robust to the jagged nature of the boundary surface, which is desired for biomedical shape analysis. The magnitude of the eigenvalues of the Laplace-Beltrami operator intuitively corresponds to the frequency in Fourier analysis, thus it provides a convenient mechanism to control the smoothness of the reconstructed surface.

Using this information, the next step is a mask deformation process at step 34 that removes the spurious features while keeping the rest of the mask intact, thus preventing unintended volume shrinkage. This deformation is topology-preserving and well-composed such that the boundary surface of the mask is a manifold. Steps 33 and 34 are iterated as indicated at 35 until convergence. Lastly, the method generates the final surface at 36 as the eigen-project of the mask boundary, which is a smooth surface with genus zero topology. This manifold representation of the regional organelle boundaries facilitates the algorithmic understanding of all shapes, for example, including crescent-shaped, multi-lobed, and folded, as long as shape topology is homeomorphic to a sphere. The exemplar results of this step are presented in FIG. 4. In this way, robust reconstruction of the cell nuclei and nucleoli surfaces is performed as genus zero two-dimensional manifolds from their segmented masks using iterative mask filtering process. Further details regarding this process is described by Y G Shen et al. in "Robust Surface Reconstruction via Laplace-Beltrami Eigen-Projection and Boundary Deformation" IEEE Transactions on Medical Imaging 2010 which is incorporated in its entirety herein.

In the example embodiment, six shape measures are used as features quantifying geometric characteristics of the 3D surfaces. To calculate these measures, the principal (min and max) curvatures ($K_1 \leq K_2$) are computed using triangulated surface models representing the boundaries of genus zero solids. Then, shape morphometry measures can be expressed in terms of principal curvatures: mean curvature, shape index and curvedness. Mean curvature is defined as $$MC = \frac{\kappa_1 + \kappa_2}{2},$$

shape index is defined as $$SI = \frac{2}{\pi}\arctan\left(\frac{\kappa_1 + \kappa_2}{\kappa_2 - \kappa_1}\right),$$

and curvedness is defined as $$CV = \sqrt{\frac{\kappa_1^2 + \kappa_2^2}{2}}.$$

Figure 5:
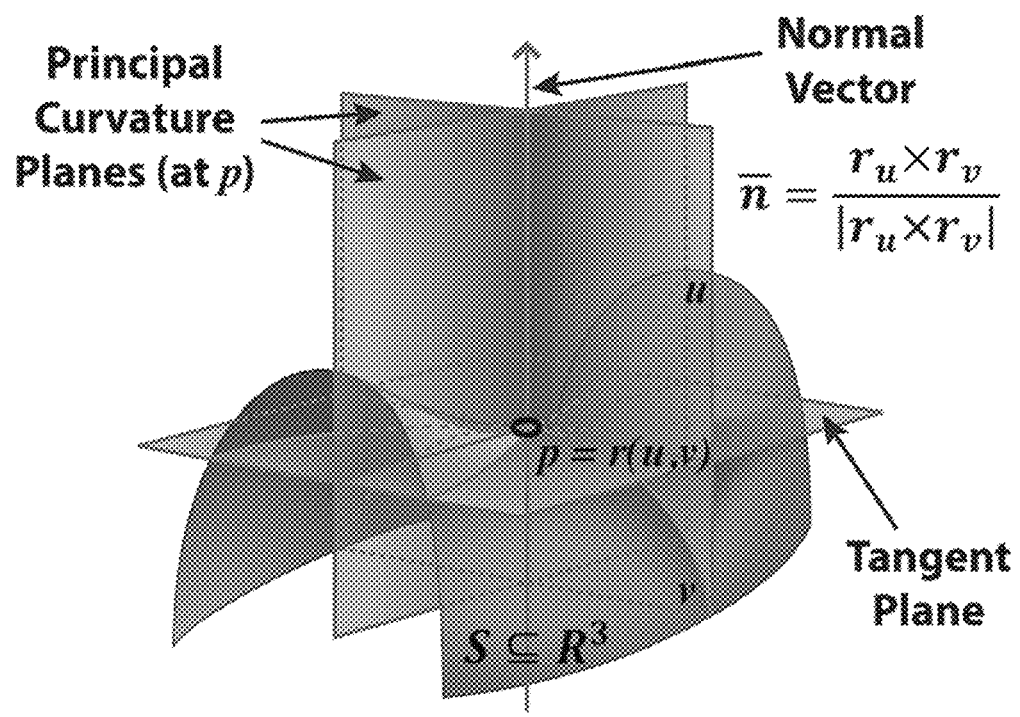
FIG. 5 is a diagram depicting the (local) geometry of 2-manifolds, including per vertex definitions of curvature relative to a local coordinate framework.

The principal curvatures of a surface are the eigenvalues of the Hessian matrix (second fundamental form), which solve for k[H−kl]=0, where 1 is the identify matrix. If S is a surface with second fundamental form H (X, Y), p∈M is a fixed point, and we denote an orthonormal basis, u, v of tangent vectors at p, then the principal curvatures are the eigenvalues of the symmetric Hessian matrix, H=

$$\begin{bmatrix} H_{u,u} & H_{u,u} \\ H_{v,u} & H_{v,v} \end{bmatrix} = H_{uu}\partial u^2 + 2H_{u,v}\partial u \partial v + H_{v,v}\partial v u^2,$$

a.k.a. shape tensor. Let r=r (u, v) be a parameterization of the surface S⊆R³, representing a smooth vector valued function of two variables with partial derivatives with respect to u and v denoted by $r_u$ and $r_v$ as seen in FIG. 5. Then, the Hessian coefficients $H_{i,j}$ at a given point (p) in the parametric u, v-plane are given by the projections of the second partial derivatives of r at that point onto the normal to $$S, n = \frac{r_u \times r_v}{|r_u \times r_v|},$$

and can be computed using the dot product operator: $H_{u,u}=r_{u,u}\cdot n$, $H_{u,v}=H_{u,v}=r_{u,v}\cdot n$, $H_{v,v}=r_{v,v}\cdot n$.

Three additional shape measures are volume, surface area and fractal dimension. Volume is the amount of 3D space enclosed by a closed boundary surface and can be expressed as $V=\iiint_\mathbb{R} I_D(x,y,z)dxdydz$, where $I_D(x,y,z)$ represents the indicator function of the region of interest (D). If r(u,v) is a continuously differentiable function and the normal vector to the surface over the appropriate region D in the parametric u, v plane is denoted by $\vec{r}_u \times \vec{r}_v$, then $S_\Omega$:r=r(u, v), (u. v)∈Ω is the parametric surface representation of the region boundary. Then surface area can be expressed as $SA=\iint_\Omega |\vec{r}_u \times \vec{r}_v| dudv$. The fractal dimension calculations are based on the fractal scaling down ratio, ρ, and the number of replacement parts, N. Accurate discrete approximations of these metrics were used to compute them on a mesh-represented surfaces as described by M. Meyer et al.'s "Discrete Differential-Geometry Operators for Triangulated 2-Manifolds", Visualization and Mathematics III, Berlin, Heidelberg: Springer Berlin Heidelberg; 2003, pps. 35-57; and by A. Jagannathan's "Segmentation and Recognition of 3D Point Clouds within Graph-theoretic and thermodynamic frameworks" a thesis. Thesis (Ph D), Northeastern University, 2005.

The extracted 3D morphometric measures served as features for a feature vector. In one embodiment, the feature vector includes measures for each nuclei. Specifically, features for each nuclei include volume of the nuclei, surface area of the nuclei, mean curvature of the nuclei, shape index of the nuclei, curvedness index of the nuclei and fractal dimension of nuclei. The feature vectors are in turn used to train a number of machine learning classifiers, for example using the open-source Python package scikit-learn 0.17.0. To improve behavior of the classification algorithms, data pre-processing includes standard steps of variable standardization to the zero mean and unit variance as well as normalization for scaling individual samples to a unitary norm, calculated on training set separately at each step of cross-validation.

In the example embodiment, nucleoli data was aggregated with morphometric measures for each nucleus. For example, the number of detected nucleoli per nucleus was included as an individual feature of the feature vector. Different approaches were investigated for merging nucleoli-level features, including custom nuclei-level dissimilarity metrics and multiple instance learning framework. The best results were achieved by aggregating the nucleoli data within each nucleus by estimating the densities of each morphometry measures. For each nucleus, sample statistics (e.g., average, minimum, maximum, and higher moments) were computed for each morphometry measure across the nucleoli within. These statistics were used to augment the signature feature vectors of the corresponding parent nuclei such that all feature vectors are of the same length. Correspondingly, nuclei that did not have any automatically detected internally positioned nucleoli were excluded from further analysis, such that for each nucleus there was at least one nucleolus. In general, correct classification of every single cell (type, stage, treatment, etc.) is a challenging task due to significant population heterogeneity of the observed cell phenotypes. For example, the same sample may contain a close mixture of intertwined "cancerous" and "non-cancerous" cells phenotypes or both classes may include apoptotic cells exhibiting similar shapes or sizes. Given the nature of cell samples, culturing, preparation and collection, classification of cell sets was considered rather than single cells. The rationale behind this is based upon the observation that even if an algorithm misclassifies a few cells in a sample, the final (cell set) label will still be assigned correctly, as long as majority of cells are classified correctly. Using this strategy, classification is preferably performed on small groups of cells, ranging from 3 to 19 cells per set. During each fold of the internal cross-validation, these small cell sets were randomized by bootstrapping procedures with 1,000 repetitions.

While the LONI Pipeline is a popular tool in neuroimaging and bioinformatics, it has been so far overlooked by the cell bioimage analysis community. In this disclosure, the LONI Pipeline is used for the implementation of a streamlined multi-step protocol that relies on a diverse set of tools and solutions seamlessly connected in the LONI Pipeline workflow as seen in FIG. 6. From a high-level perspective, every step of data processing and analysis protocol is wrapped as an individual module in the workflow that provides input and output specifications that allow the Pipeline to automatically connect and manage these atomic modules. As a result, distributed, massively parallel implementation of the protocol makes it possible to easily process thousands of nuceli and nucleoli simultaneously. The workflow does not depend on the total number of 3D objects, biological conditions, or a number of running instances since its execution is completely automated once the workflow configuration is fixed, including job scheduling and resource allocation. During the execution, the workflow provides a researcher with real-time information about progress, allows to view intermediate results at every individual step and easily examine and restart failed modules or specific instances. This implementation is also highly flexible and is not limited to specific tools included in the workflow. It can be repurposed for a wide range of different experiments by adjusting parameters and replacing individual modules, while preserving high-throughput capabilities.

The workflow is configured in a way that it can consume data in the format that is used to share it, i.e. a 1024×1024×Z 3D volumes in three channels as 16-bit 3D TIFF files. Each volume is processed independently, in parallel fashion, such that workflow automatically defines how many processes are needed to analyze all of input data. Moreover, parallelization of the workflow automatically branches out and collapses as needed. For example, from pre-processing to segmentation workflow execution starts M processes, where M is a number of input volumes. Since segmentation produces multiple outputs, after this step workflow automatically initiates M×[$N_1, N_2, \ldots, N_M$] processes, where $N_X$ is a number of segmented objects (e.g., nuclei) from input volume X. At post-processing step, some of segmented objects are filtered out by the curation module and excluded from further analysis. Workflow automatically reduces a number of processes to the number of masks that passes curation, 3D shape modeling and morphometric feature extraction are performed on individual masks independently, which allows one to simultaneously run up to 1,200 jobs on the cluster during experiments effectively reducing the computing time. Finally, workflow collects morphometry information from each individual mask and combines them in the results table that is further used as an input to classification algorithm. This capabilities allow to take advantage of modern computational resources, lift the burden of low-level configuration from researchers, make it easier to control the execution process, and improve reproducibility of the end-to-end process.

To validate the shape morphometry metrics, the metrics were first applied to synthetically generated 3D masks. The scikit-image Python library is used to create 3D solids representing cubes, octahedral, spheres, ellipsoids, and three overlapping spheres with linearly aligned centers. All of these objects were processed and the resulting shape morphometry measures were compared. Specifically, it is desirable to confirm that close relation between the (expected) analytically derived measures of volume and surface area computed using the corresponding shape parameters (e.g., radius, size), and their computationally derived counterparts reported by the processing pipeline workflow. Results illustrate that for nucleus-like shapes, e.g., sphere and ellipsoid, the computational error was within 2%. For more geometric objects, e.g., cube and octahedron, the calculation error was within 6%. The increased error in the latter case can be explained by mesh smoothing applied at the shape vertices to resolve points of singularity (e.g., smooth, but non-differentiable surface boundaries). To demonstrate the detection of shape differences between different types of 3D objects, overlapping spheres were compared against circumscribed ellipsoids. As expected, the average mean curvature and curvedness measures were lower and shape index values were higher for spheres compared to ellipsoids. It was observed that a progressive monotonic shape morphometry measure trends when comparing spheres, ellipsoids and overlapping spheres. This simulation confirmed an ability to accurately measure size and shape characteristics of 3D objects which forms the basis for machine-learning based object classification based on boundary shapes.

To assess chosen shape morphometry metrics as discriminatory features, they are compared to SPHARM coefficients for single fibroblast cell nuclei classification. Fibroblast (newborn male) were purchased from ATCC (BJ Fibroblasts CRL-2522 normal) and subjected to a G0/G1 Serum Starvation Protocol. This protocol provided images of the following conditions or phenotypes: cell cycle synchronized by serum-starvation (SS) and proliferating (PROLIF). As the result, 962 nuclear masks were successfully processed by both approaches: 466 PROLIF and 496 SS.

For method comparison, nuclear binary masks were extracted. We computed shape morphometry measures as described above. To obtain SPHARM coefficients, we used popular SPHARM-MAT toolbox that implements surface reconstruction and spherical parametrization using CALD algorithm followed by the expansion of the object surface into a complete set of spherical harmonic basis functions of degree l=13 (default setting), and, finally, by SHREC method to minimize the mean square distance between corresponding surface parts, SPHARM shape descriptors were computed as described by L. Shen et al. in "Spherical mapping for processing of 3D closed surfaces", and used as feature vectors for classification.

The open-source Python package Scikit-learn 0.17.0 was employed to test a number of commonly used machine learning classification methods on derived feature vectors with default parameters for each method and identical random seed when applicable. Performance was compared using 5-fold cross-validation technique and the area under the receiver operating characteristic curve (AUC) as metric. As shown in Table 1 below, 3D shape morphometric measures not only demonstrate comparable discriminative performance to SPHARM coefficients, but outperform them using all tested algorithms.

TABLE 1

Comparison of SPHARM coefficients and our shape morphometry descriptors for single cell fibroblast nuclei classification

| Classification algorithm | SPHARM coefficients, mean AUD | Shape morphometry measures, Mean AUC |
|---|---|---|
| k-Nearest Neighbors | 0.583 | 0.671 |
| Linear SVM | 0.620 | 0.706 |
| Gaussian SBM | 0.577 | 0.728 |
| Random Forest | 0.620 | 0.694 |
| AdaBoost | 0.632 | 0.701 |
| Gradient Boosting | 0.660 | 0.722 |

After segmentation and morphometric feature extraction for both nuclei and nucleoli as described above, the full dataset for fibroblasts classification consisted of total 965 nuclei (498 SS and 470 PROLIF) and 2,181 nucleoli (1,151 SS and 1,030 PROLIF). The best result by a single classifier was achieved using a stochastic gradient boosting classifier with 1,500 base learners, maximum tree depth 8, learning rate 0.01, subsampling rate 0.5, and minimum number of samples at a leaf node 3. Hyper-parameters were fine-tuned by cross-validated grid search. To evaluate these classification results, we measured accuracy, precision, sensitivity and AUC over 10 randomized repetitions of 7-fold internal statistical cross-validation, which are presented in Table 2 for single cell and 9-cell-set classification.

TABLE 2

Fibroblast single cell and 9-cell sets classification accuracy

| Measure | Single cell, Mean (±SD) | 9 cells set, mean (±SD) |
|---|---|---|
| Accuracy | 0.754 (±0.037) | 0.951 (±0.029) |
| Precision | 0.769 (±0.047) | 0.968 (±0.035) |
| Sensitivity | 0.731 (±0.055) | 0.935 (±0.049) |
| AUC | 0.754 (±0.037) | 0.951 (±0.029) |

FIG. 7A shows mean AUC values for set sizes from 3 to 19 cells. A 95% accuracy is reached when classifying sets with 9 cells and 98% for sets with 15 or more cells. The gradient boosting classifier also computes and reports cross-validated feature importance as seen in FIG. 7B. These allow one to evaluate which measures were significantly different between two cell conditions and potentially propose novel research hypotheses that can be tested using prospective data. Both nuclear (top-3) and nucleolar (5 of top-10) morphometry features were reported to be of high importance for distinguishing SS fibroblasts from PROLIF. Higher moment statistics of nucleolar shape morphometry were eliminated from feature list during feature selection, since they did not contribute as much to the classification, possibly due to the small sample size—most cells only had 1-3 nucleoli per nucleus.

Throughout the course of progression to metastasis, malignant cancer cells undergo a series of reversible transitions between intermediate phenotypic states bounded by pure epithelium and pure mesenchyme. These transitions in prostate cancer are associated with quantifiable changes in nuclear structure. Microscope slides or prostate cancer cell line P3 were cultured in epithelial (EPI) and mesenchymal transition (EMT) phenotypic states. Derived dataset consisted of 458 nuclear (310 EPI and 148 EMT) and 1,101 nucleolar (649 EPI and 452 EMT) masks. Random uniform subsampling was used to resolve the large sample-size imbalance between the 2 classes. In each fold of 7-fold cross-validation process, there were ~250 cells in the training set and another ~40 cells in the testing data.

In this case, the best classification by single classifier was the result of applying a random forest model (1,000 trees, maximum tree depth 12, maximum number of features for the best split 40%). Hyper-parameters fine-tuning, accuracy metrics, and cross-validation procedures were identical to the ones reported in the previous fibroblast experiment. Similarly, to the fibroblast cell classification, classification of sets of 9 cells achieved a mean accuracy of 95.4%, which increased to 98% for sets of 15 or more cells (see Table 3). FIG. 8A reports the AUC for different group sizes to show how the classification accuracy increases with the cell-set size and reaches 98% for sets of 13 cells. In this experiment, we also examined the classifier-reported feature importance. The top 10 important features in this classification included nuclear (3 of top 10, 2 of which are also Fibroblast top-2) and nucleolar (top-5) shape morphometry features.

TABLE 3

PC3 single cell and 9-cell sets classification accuracy

| Measure | Single cell, Mean (±SD) | 9 cells set, mean (±SD) |
|---|---|---|
| Accuracy | 0.764 (±0.059) | 0.954 (±0.059) |
| Precision | 0.761 (±0.080) | 0.943 (±0.085) |
| Sensitivity | 0.787 (±0.080) | 0.978 (±0.043) |
| AUC | 0.764 (±0.059) | 0.954 (±0.059) |

In this disclosure, a protocol is presented that provides a high-throughput, mostly-automated ("human-in-the-loop") solution for 3D modeling, morphological feature extraction, and classification of cell types or treatment conditions. Compared to other studies using 2D projections, this approach operates natively in 3D space and takes advantage of extrinsic and intrinsic morphometric measures that are more representative of the real, underlying nuclear and nucleolar geometry and allow easy human interpretation. Robust surface reconstruction allows accurate approximation of 3D object boundary that was validated on synthetic data. Suggested shape morphometric measures outperformed another popular approach and demonstrated their universality across different cell types, conditions and even domains.

The final end-to-end protocol is highly parallel, it's throughput is practically limited by the number of computing nodes, thus, it can process thousands of objects simultaneously, while requiring minimal human intervention. This pipeline workflow takes advantage of diversity of bioimage analysis software and integrates a number of open-source tools for different steps of data processing and analytics. Workflow's modularity enables high reusability and the ease of modification. This allows to use the same workflow or customize and expand it (e.g., specification of new datasets, swapping of specific atomic modules) for other purposes that require the analysis of a diverse array of cellular, nuclear, or other studies. Live demo via the LONI Pipeline demonstrates simplicity of use and high efficiency of parallel data processing.

3D imaging data is produced for 2 cell lines which have been shared publicly to promote results reproducibility, facilitate open-scientific development, and enable collaborative validation. This 3D image dataset is one of the largest publicly available dataset of this type (includes 3-channel original data with ~1,500 nuclear and ~2,700 nucleolar marks). The classification results on these data comparing epithelial vs. mesenchymal human prostate cancer cell lines and serum-starved vs. proliferating fibroblast cell lines, demonstrated high accuracy of cell type prediction using 3D morphometry, especially when applied to sets of cells. Although different classification algorithms appeared to be optimal for different experiments, it was observed that both nuclear and nucleolar morphometric measures are important features for discriminating between treatment conditions or cell phenotypes. In the case of fibroblast classification, the results show the importance of nuclear morphometry, the number of nucleoli per nucleus, and various internal nucleolar morphometric measures. For PC3 cells, the most important classification features were moments of the distributions of various nucleolar morphometry measures along with nuclear size and shape. Interestingly, there were three common morphometric features among the top-10 most important ones for both cell lines. This confirms previously reported observations and demonstrates that this method extracts relevant information from cell forms to successfully classify cells using a combination of criteria.

The proposed approach is scalable and capable of processing various complex big 3D imaging data, and not limited to nuclear and nucleolar shapes. With some changes, it can be applied to other cellular and nuclear components of interest. Robust smooth surface reconstruction can be directly applied to any 3D shapes as long as their topology is sphere-like. Together with molecular level techniques, such as Hi-C, this 3D shape morphometry workflow can form a powerful combination for the investigation of DNA architecture in the spatial and temporal framework of 4D nucleome. One example of possible future applications of this workflow is to study asymmetric cell division. Stem and progenitor cells are characterized by their ability to self-renew and produce differentiated progeny. A balance between these processes is achieved through controlled asymmetric divisions and is necessary to generate cellular diversity during development and to maintain adult tissue homeostasis. Disruption of this balance may result in premature depletion of the stem/progenitor cell pool, or abnormal growth. In many tissues, dysregulated asymmetric divisions are associated with cancer. Whether there is a casual relationship between asymmetric cell division defects and cancer initiation is unknown. It is envisioned that the shape analysis pipeline will be useful in studying the 4D nucleome topology of morphogenesis and cancer initiation.

The ability to automate the processes of specimen collection, image acquisition, data pre-processing, computation of derived biomarkers, modeling, classification and analysis can significantly impact clinical decision-making and fundamental investigation of cell deformation. This appears to the first attempt to combine 3D cell nuclear shape modeling by robust smooth surface reconstruction and extraction of shape morphometry measure into a highly parallel pipeline workflow protocol for end-to-end morphological analysis of thousands of nuclei and nucleoli in 3D. This approach allows efficient and informative evaluation of cell shapes in the imaging data and represents a reproducible technique that can be validated, modified, and repurposed by the biomedical community. This facilitates result reproducibility, collaborative method validation, and broad knowledge dissemination.

Portions of the techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An automated method for analyzing biological tissues and cells, comprising:
   staining constituents of a biological sample, where the biological sample includes tissue or cell culture containing at least one cell;
   receiving image data of the biological sample, where the image data provides a three-dimensional representation of the biological sample;
   labeling constituents of the at least one cell in the image data;
   for each labeled tissue biomarker or cell or sub-cellular organelle or component in the image data, constructing a mathematical representation of boundaries defining a given cell nuclei, including by chromosome territories, topological associated domains (TADs), lamina associated domains (LADs), or telomeric boundaries;
   extracting features for each of the labeled tissue biomarker or cell or sub-cellular organelle or component using the mathematical representation of boundaries defining a given cell nuclei, where the features are measures of shape and size of the labeled tissue biomarker or cell or sub-cellular organelle or component;
   storing two or more models for cell classification; and
   classifying the biological sample by comparing the extracted features of the labeled tissue biomarker or cell or sub-cellular organelle or component to the stored models.

2. The method of claim 1 further comprises generating the image data using a three-dimensional image acquisition technique.

3. The method of claim 1 wherein labeling constituents further comprises segmenting the image data into volumes, which represent the constituents.

4. The method of claim 1 wherein constructing a mathematical representation further comprises using iterative Laplace-Beltrami eigen-projection and boundary deformation.

5. The method of claim 1 wherein the features extracted from the labeled tissue biomarker or cell or sub-cellular organelle or component include determining one or more of a volume of a labeled tissue biomarker or cell or sub-cellular organelle or component, a surface area of a labeled tissue biomarker or cell or sub-cellular organelle or component, mean curvature of a labeled tissue biomarker or cell or sub-cellular organelle or component, shape index of a labeled tissue biomarker or cell or sub-cellular organelle or component, curvedness index of a labeled tissue biomarker or cell or sub-cellular organelle or component, and fractal dimension of a labeled tissue biomarker or cell or sub-cellular organelle or component.

6. The method of claim 1 further comprises classifying the biological sample using a random forest classification method.

7. The method of claim 1 further comprises classifying the biological sample using a classification method selected from a group consisting of linear classifiers, k nearest neighbor method, decision tree methods, neural networks, and support vector machines.

8. The method of claim 1 further comprises classifying the biological sample only if the biological sample contains more than three cells.

9. The method of claim 1 wherein staining constituents of the biological sample using a label for a tissue biomarker or cell or sub-cellular organelle or component, such as fibrillarin antibody, ethidium bromide and 4',6-diamidino-2-phenylindole.

10. The method of claim 1 wherein the biological sample is from a cell culture or cell tissue.

11. An automated method for analyzing biological cells, comprising:
   staining constituents of a biological sample, where the biological sample includes at least one cell;
   receiving image data of the biological sample, where the image data provides a three-dimensional representation of the biological sample;
   labeling constituents of the at least one cell in the image data;
   for each labeled cell nuclei in the image data, constructing a mathematical representation of boundaries defining a given cell nuclei;
   extracting features for each of the labeled cell nuclei using the mathematical representation of the cell nuclei, where the features are measures of shape and size of the labeled cell nuclei;
   for each labeled cell nucleoli, constructing a mathematical representation of boundaries defining a given cell nucleoli;
   extracting features from each of the labeled cell nucleoli using the mathematical representation of the cell nucleoli, where the features are measures of shape and size of the labeled cell nucleoli;
   storing two or more models for cell classification; and
   classifying the biological sample by comparing the extracted features of the labeled cell nucleus and the labeled cell nucleolus to the stored models.

12. The method of claim 11 further comprises generating the image data using a confocal microscope.

13. The method of claim 11 wherein labeling constituents further comprises segmenting the image data into volumes which represent the constituents.

14. The method of claim 11 wherein constructing a mathematical representation further comprises using iterative Laplace-Beltrami eigen-projection and boundary deformation.

15. The method of claim 11 wherein the features extracted from the labeled cell nucleus include determining one or more of a volume of a labeled cell nuclei, a surface area of a labeled cell nuclei, mean curvature of a labeled cell nuclei, shape index of a labeled cell nuclei, curvedness index of a labeled cell nuclei, and fractal dimension of a labeled cell nuclei.

16. The method of claim 15 wherein the features extracted from the labeled cell nucleolus include determining one or more of a count of nucleoli in corresponding cell nuclei, a volume of a labeled cell nucleoli, surface area of a labeled cell nucleoli, mean curvature of a labeled cell nucleoli, shape index of a labeled cell nucleoli, curvedness index of a labeled cell nucleoli, and fractal dimension of a labeled cell nucleoli.

17. The method of claim 11 further comprises classifying the biological sample using a random forest classification method.

18. The method of claim 11 further comprises classifying the biological sample using a classification method selected from a group consisting of linear classifiers, k nearest neighbor method, decision tree methods, neural networks and support vector machines.

19. The method of claim 11 further comprises classifying the biological sample only if the biological sample contains more than three cells.

20. The method of claim 11 wherein staining constituents of the biological sample using fibrillarin antibody, ethidium bromide and 4',6-diamidino-2-phenylindole.

21. The method of claim 11 wherein the biological sample is from a cell culture.

* * * * *